US007689520B2

(12) United States Patent
Burges et al.

(10) Patent No.: US 7,689,520 B2
(45) Date of Patent: Mar. 30, 2010

(54) MACHINE LEARNING SYSTEM AND METHOD FOR RANKING SETS OF DATA USING A PAIRING COST FUNCTION

(75) Inventors: Christopher J. C. Burges, Bellevue, WA (US); Tal Shaked, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 998 days.

(21) Appl. No.: 11/066,514

(22) Filed: Feb. 25, 2005

(65) Prior Publication Data

US 2006/0195406 A1    Aug. 31, 2006

(51) Int. Cl.
*G06F 15/18* (2006.01)

(52) U.S. Cl. ...................................................... 706/12
(58) Field of Classification Search ................... 706/12
See application file for complete search history.

(56) References Cited

U.S. PATENT DOCUMENTS

| 5,625,751 | A | 4/1997 | Brandwajn et al. |
| 5,649,068 | A * | 7/1997 | Boser et al. .................... 706/12 |
| 6,260,013 | B1 | 7/2001 | Sejnoha |
| 6,526,440 | B1 | 2/2003 | Bharat |
| 7,281,002 | B2 | 10/2007 | Farrell |
| 2003/0236662 | A1 | 12/2003 | Goodman |
| 2005/0049990 | A1* | 3/2005 | Milenova et al. ............... 706/48 |
| 2005/0144158 | A1 | 6/2005 | Capper et al. |

OTHER PUBLICATIONS

Freund, Y., Iyer, R., Schapire, R. and Singer, Y. "An Efficient Boosting Algorithm for Combining Preferences", J. of Machine Learning Research 4 (2003) 933-969.*
Freund et al. "An Efficient Boosting Algorithm for Combining Preferences", J. of Machine Learning Research 4 (2003) 933-969.*
Storn, et al., "Differential Evolution—A Simple and Efficient Heuristic for Global Optimization over Continuous Spaces", 1996.
Xia, et al., "A One-Layer Recurrent Neural Network for Support Vector Machine Learning", 2004.
Cohen, et al., "Volume Seedlings", 1992.
Storn, "On the Usage of Differential Evolution for Function Optimization", 2002.
Jarvelin, et al., Cumulated Gain-Based Evaluation of IR Techniques, 2002.
International Search Report and Written Opinion dated Mar. 6, 2008 for PCT Application Serial No. PCT/US06/26266, 11 Pages.
Joachims. "Optimizing Search Engines using Clickthrough Data" ACM SIGKDD 02, Edmonton, Alberta, Canada. pp. 133-142. Last accessed Jun. 26, 2008, 10 pages.

(Continued)

*Primary Examiner*—David R Vincent
*Assistant Examiner*—Li-Wu Chang
(74) *Attorney, Agent, or Firm*—Lee & Hayes, PLLC

(57) ABSTRACT

A machine learning system to rank data within sets is disclosed. The system comprises a ranking module that has differentiable parameters. The system further comprises a cost calculation module that uses a cost function that depends on pairs of examples and which describes an output of the ranking module. Methods of using the disclosed system are also provided.

12 Claims, 14 Drawing Sheets

OTHER PUBLICATIONS

OA dated Jun. 26, 2008 for U.S. Appl. No. 11/378,086, 27 pages.

G. S. Kimeldorf, et al., "Some results on Tehebycheffian Spline Functions" J. Mathematical Analysis and Applications, 1971, vol. 33, pp. 82-95.

B. Scholkopf, et al., "Learning with Kernels", MIT Press, 2002.

U.S. Appl. No. 11/305,395, Burges, et al.

U.S. Appl. No. 11/378,086, Burges, et al.

C. Burges, et al, "Learning to Rank Using Gradient Descent", Proceedings of the 22nd international conference on Machine learning, ACM International Conference Proceeding Series; 2005, pp. 89-96, vol. 119, Bonn, Germany.

C. Burges, "Ranking as Learning Structured Outputs", in Proceedings of the NIPS 2005 Workshop on Learning to Rank, Dec. 2005, 4 pages.

B. Scholkopf, et al., "Learning with Kernels", MIT Press, 2002, pt. 1, 100 pages (front cover-80).

B. Scholkopf, et al., "Learning with Kernels", MIT Press, 2002, pt. 2, 100 pages (81-180).

B. Scholkopf, et al., "Learning with Kernels", MIT Press, 2002, pt. 3, 100 pages (181-280).

B. Scholkopf, et al., "Learning with Kernels", MIT Press, 2002, pt. 4, 100 pages (281-380).

B. Scholkopf, et al., "Learning with Kernels", MIT Press, 2002, pt. 5, 100 pages (381-480).

B. Scholkopf, et al., "Learning with Kernels", MIT Press, 2002, pt. 6, 100 pages (481-580).

B. Scholkopf, et al., "Learning with Kernels", MIT Press, 2002, pt. 7, 49 pages (581-back cover).

Cohen, et al. "Volume Seedlings", 1992.

Jarvelin, et al. "Cumulated Gain-Based Evaluation of IR Techniques" 2002.

Storn, et al. "Differential Evolution—A Simple and Efficient Heuristic for Global Optimization over Continuous Spaces", 1996.

Storn. "On the Usage of Differential Evolution for Function Optimization", 2002.

Xia, et al. "A One-Layer Recurrent Neural Network for Support Vector Machine Learning", 2004.

Freund, et al. "An Efficient Boosting Algorithm for Combining Preferences" (1999) 9 pages.

Bromley, et al. "Signature Verification Using 'Siamese' Time Delay Nural Network." (1993) Advances in Pattern Recognition Systems Using Neural Network Technologies, World Scientific, pp. 25-44.

Burges, C. "Simplified Support Vector Decision Rules" (1996) International Conference on Machine Learning, pp. 71-77.

Dekel, et al. "Log-linear Models for Label-ranking" (2004) NIPS, 8 pages.

Harrington, E. "Online ranking/collaborative filtering Using Perceptron Algorithm" (2003) ICNL, 8 pages.

Hastie, et al. "Classification by Pairwise Coupling" (1998) NIPS, pp. 451-471.

Jarvelin, et al. "IR Evaluation Methods for Retrieving Highly Relevant Documents" (2000) Proceedings of the 23rd annual ACM SIGIR, pp. 41-48.

Mason, et al. "Boosting Algorithms as Gradient Descent" (2000) NIPS 7 pages.

Caruana, et al. "Using the Future to 'Sort Out' the Present: Rankprop and Multitask Learning for Medical Risk Evaluation" (1996) NIPS, pp. 959-965.

Crammer, et al. "Pranking with Ranking" (2001) NIPS, 7 pages.

Baum, et al. "Supervised Learning of Probability Distributions by Neural Networks" (1988) Neural Information Processing Systems, pp. 52-61.

Bradley, et al. "The Rank Analysis of Incomplete Block Designs 1: The Method of Paired Comparisons" Biometrika (1052) 39, pp. 324-245.

Orr, et al. "Neural Networks: Tricks of the Trade" , Springer, 1998.

Refregier, et al. "Probabilistic Approach for Multiclass Classification with Neural Networks" (1991) Proceedings of the 1991 International Conference on Artificial Neural Networks (ICANN-91) 5 pages.

Herbrich, et al. "Large Margin Rank Boundaries for Ordinal Regression" (2000) Advances in Large Margin Classifiers, pp. 115-132.

Mitchell. "Machine Learning" New York: McGraw-Hill.

* cited by examiner

MACHINE LEARNING SYSTEM AND METHOD FOR RANKING SETS OF DATA USING A PAIRING COST FUNCTION

TECHNICAL FIELD

The present invention relates generally to machine learning, and more particularly to machine learning systems and methods for ranking sets of data.

BACKGROUND

The amount of data available to information seekers has grown astronomically, whether as the result of the proliferation of information sources on the Internet, or as a result of private efforts to organize business information within a company, or any of a variety of other causes. As the amount of available data grows, so does the need to be able to categorize or label that data so that the data may be more efficiently searched. A related problem is the need to rank data that has been identified as responsive to a search query. One approach is to use machine learning systems for this task.

Machine learning systems include such systems as neural networks and machines using kernel-based learning methods, among others. These systems can be used for a variety of data processing or analysis tasks, including, but not limited to, optical pattern and object recognition, control and feedback systems, and text categorization. Other potential uses for machine learning systems include any application that can benefit from data classification.

When a user performs a search for information, that user typically does not simply want a listing of results that simply have some relation to the search query entered by that user but rather wants to be able to quickly access what that user considers to be the best results from within the listing. This is where ranking is important because high rankings indicate to the user that there is a high probability that the information for which the user searched is present in the highest ranked search results.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later. Additionally, section headings used herein are provided merely for convenience and should not be taken as limiting in any way.

One aspect of the disclosed invention is a machine learning system that can be used to rank data with sets. This system may be implemented with any trainable system, especially those using gradient descent training methods. Systems that are specifically contemplated are neural networks, and kernel learning machines.

In accordance with another aspect of the invention, methods of training a machine learning system to perform ranking are disclosed. The disclosed methods include the use of ranked data pairs that are evaluated and compared to a known correct result. Based upon such comparison, the system can be trained to reduce or ideally eliminate errors made in ranking. In accordance with yet another aspect of the invention, methods of determining error rates using functions such as cost functions are disclosed. The cost functions are crafted in such a way that information from calculating that function can be used to improve the functioning of the system.

Commensurate with still another aspect of the invention, a ranking system that uses feedback from users is disclosed. By employing user feedback systems and methods, the ranking system can be trained to provide ranking results that can be tailored for specific contexts or to incorporate the preferences of a specific user. Alternatively or additionally, such user feedback can be used after the system initially has been trained to improve the system's functioning with respect to attributes identified by the user as important to that user.

With reference to yet another aspect of the invention, a ranking system that employs a secondary ranking system is disclosed. A primary ranking system can be used to provide an initial ranked data set. That initial data set can then be used as input for a secondary ranking system that can be trained to re-rank based upon preferences of a specific user. Such a system allows for the use of a general ranking system that can function for many queries while each individual user can obtain personalized results by using their own secondary ranking system.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION

Figure 1:
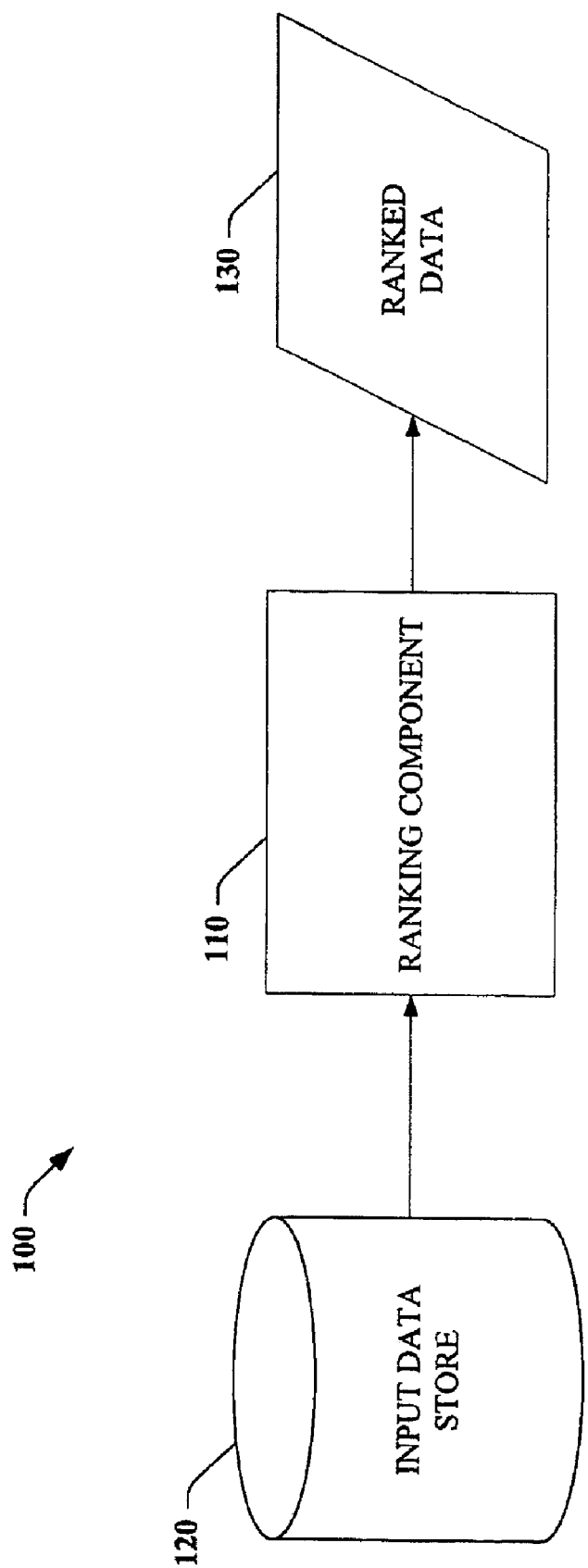
FIG. 1 is a system block diagram of a ranking system in accordance with an aspect of the disclosed invention.

The subject invention relates to systems and methods to facilitate the ranking of data. As used in this application, terms "component," "system," and the like are intended to refer to a computer-related entity, either hardware, software (e.g., in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention. Additionally, although specific examples set forth may use terminology that is consistent with client/server architectures or may even be examples of client/server implementations, skilled artisans will appreciate that the roles of client and server may be reversed, that the subject invention is not limited to client/server architectures and may be readily adapted for use in other architectures, specifically including peer-to-peer (P2P) architectures, without departing from the spirit or scope of the invention.

FIG. 1 is a system block diagram of a ranking system 100 in accordance with an aspect of the disclosed invention. The ranking system 100 includes a ranking component 110, an input data store 120, and a set of ranked data 130. The ranking component 100 can be any machine learning system that can be trained using gradient descent. Examples presented as part of this disclosure focus on an implementation using a neural network as the ranking component 110. However, artisans of ordinary skill in this area will recognize that other machine learning systems, including but not limited to, kernel learning method systems, can be utilized in connection with the subject invention. Such artisans will also readily recognize that modifications may be made to specific examples presented in order to substitute other machine learning systems in place of a neural network as the ranking component 110. Although modifications of this type may be made, those modifications are simply implementation details and do not depart from the scope of the disclosed invention.

The input data store 120 contains data to be input to and ranked by the ranking component 110. Usually data within the input data store 120 will be formatted in a suitable manner for use by the ranking component 110. The format of the data within the input data store 120 may differ based upon a mode or phase of operation of the ranking component 110, such as a training phase, a testing phase, or an operational phase.

The ranking component 110 processes the data and outputs a set of ranked data 130 that may then be used by other components or presented to a user, or both. An example of such ranked data is the result of a search for documents on a network, such as web pages on the Internet, that are responsive to a user's query. A set of responsive documents may be presented as input data and ranked in an order based upon certain criteria before being presented to the user as ranked search results.

The ranking component 100 may be a neural network that has been modified to be able to perform ranking. Neural networks are commonly used for classification and regression tasks. A neural network is commonly organized as a multi-layered, hierarchical arrangement of processing elements, also referred to as neurons, nodes or units. For the purposes of this disclosure, the terms neuron, node and unit will be used interchangeably. Each unit typically has one or more inputs and one output. Each input is typically weighted by some coefficient value. Each output of a unit is typically a result of processing its input value(s) in accordance with an activation function and any weight or bias applied.

In a hierarchical arrangement of neurons in a neural network, the neurons are usually arranged into layers. The output of a neuron in one layer can be an input to one or more neurons in a successive layer. Layers may be exposed in the sense that either the inputs of neurons in that layer directly receive input from a data source external to the neural network or the outputs of neurons are the desired result of processing. Layers may also be hidden in the sense that the inputs of units in that layer are computed using the outputs of units in a previous or lower layer, and the outputs of units in a hidden layer feed inputs for units in a successive or higher layer. An exemplary neural network can include any suitable number of layers such as an input layer, an intermediate layer, and an output layer.

The use of a neural network typically involves a training phase and a testing phase. During the training phase, one of a preselected group of data patterns called the 'training set' is presented to the network for classification. This process is often referred to as forward propagation. The actual result produced by the network is then compared with a known correct result, usually with reference to a cost function. An objective of the training step is to minimize the cost function, thereby minimizing errors in the network. Results from this comparison are then used to adjust parameters of the network, such as weights or biases, in such a way that, if that pattern were presented for forward propagation again, the network would yield a lower cost. This adjustment process is referred to as backward propagation. Forward propagation and backward propagation are usually performed successively until the cost function, averaged over a suitable, second preselected group of data patterns called a 'validation set', is minimized.

When training is completed, the parameters of the network are frozen and can no longer be changed. At that point the network is said to be fully trained. A test data set is presented to the network and the results of computation on that test set are evaluated with a known ideal result. If that evaluation yields a result that is within an acceptable margin, the network is accepted for use.

Figure 2:
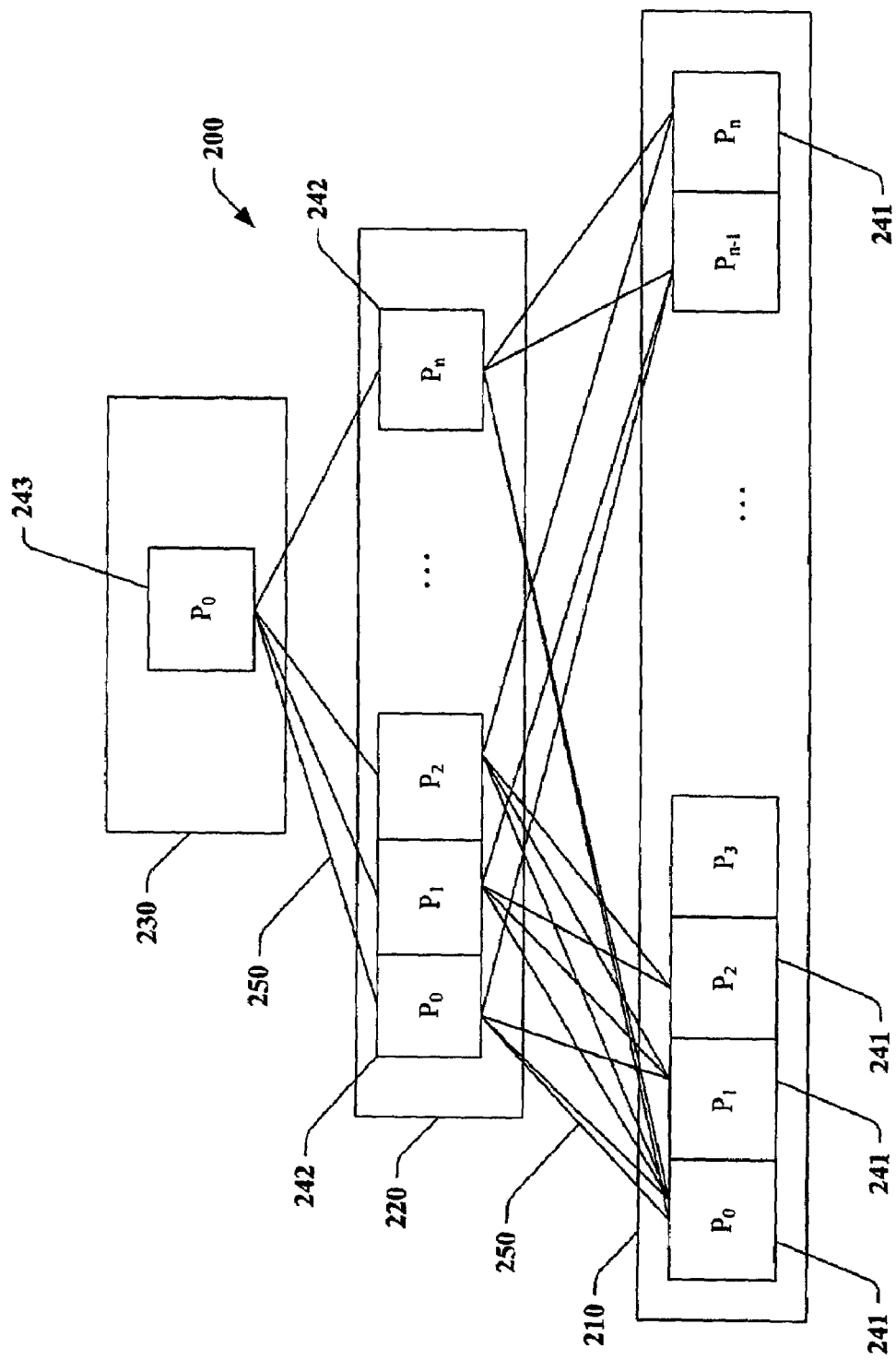
FIG. 2 is a system block diagram of a multi-layer neural network that can be utilized in connection with the disclosed invention.

FIG. 2 is a system block diagram of a multi-layer neural network 200 that may be used as the ranking component 110. The neural network 200 depicted includes an input layer 210, a hidden layer 220, and an output layer 230. Each layer includes one or more neurons 241, 242, 243 that each accept an input; process that input with respect to some predefined function and optional weight or bias; and provide an output. The units in each layer are connected to each other via a number of connections 250. In the example depicted, each layer is fully connected with adjacent layer(s), meaning that each unit in that layer is connected to every unit in the layer(s) adjacent to the layer in which that unit resides. For presentation clarity, some units and some connections have been omitted from the figure. It should be appreciated that the exact number and configuration of units in the neural network is an implementation detail within the level of skill of the ordinary artisan in this area and that the specific configuration depicted in FIG. 2 and discussed herein should not be taken as a limiting factor.

The input layer 210 is the layer that initially receives input data to be ranked. Typically, the input data is structured such that a number of attributes of interest are defined and each attribute has an associated value. A common, and in many cases preferred, configuration of the input layer 210 is for that layer to have a number of units equal to the number of attributes of interest of the data to be processed. Each unit 241 in the input layer 210 will then process a single attribute of the input data and feed the results of its processing forward to the units 242 of the hidden layer 220. Typically the units in the input layer do not have associated biases, whereas every other unit in the network does. Similarly, the units 242 of the hidden layer 220 will process data input to them from the units 241 of the input layer 210 and feed results of their processing forward to the units 243 of the output layer 230. The units 243 of the output layer 230 similarly process their respective input data and output results.

Figure 3:
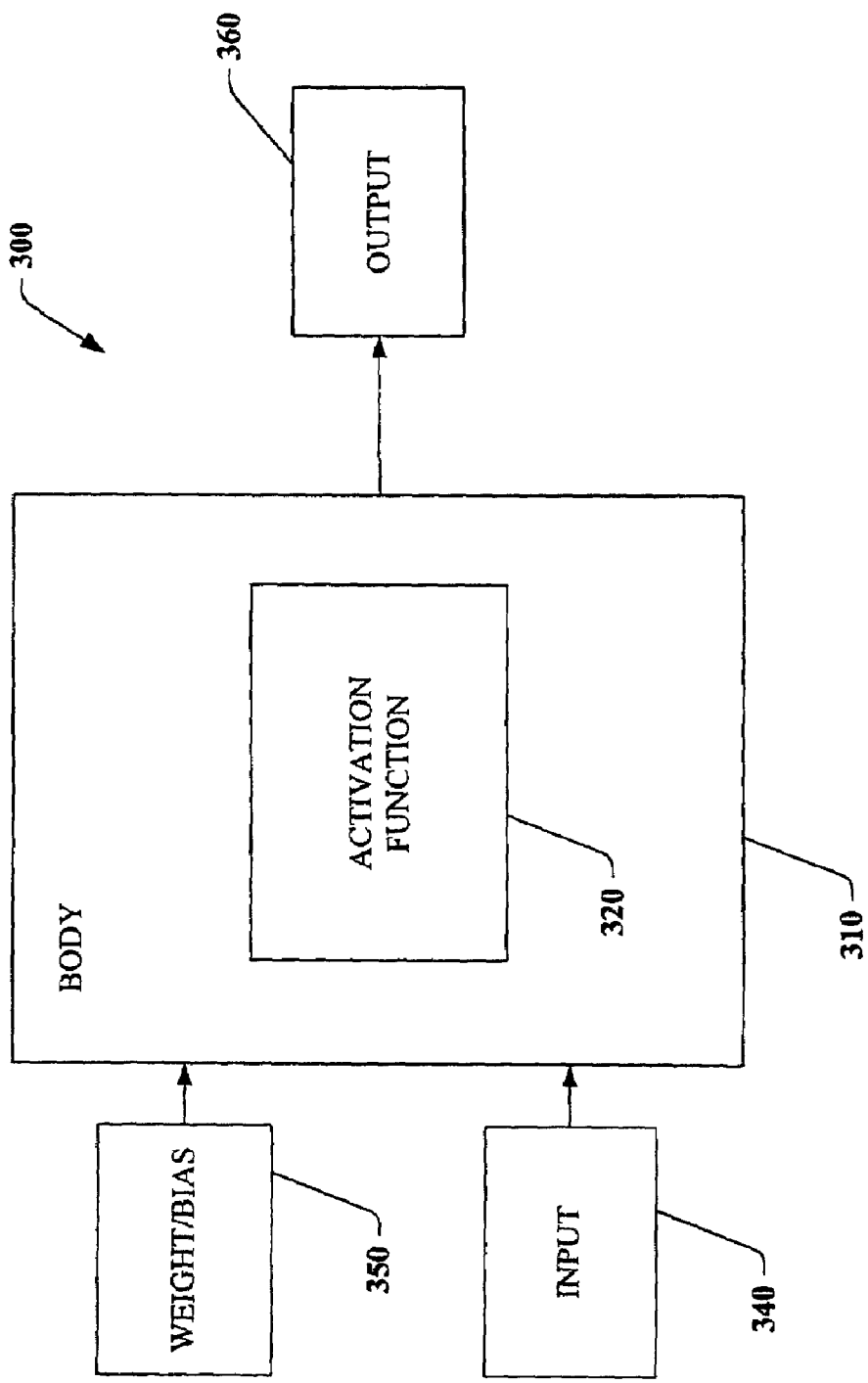
FIG. 3 is a system block diagram of a unit in accordance with an aspect of the disclosed invention.

Turning now to FIG. 3, a sample unit 300 is depicted in system block diagram form. The unit 300 includes a body 310 that performs data processing in accordance with a predefined process. Usually that process is in the form of an activation function 320. Specific activation functions that may be employed are largely a matter of implementation choice but are typically some form of sigmoidal function.

An input 340 feeds data into the body 310 for processing in accordance with its predefined functions. A weight or bias 350 is also depicted as an input into the body 310 of the unit 300, although other weighting or biasing means may be used, such as a variable within the body 310 of the unit 300. An output 360 is the result of passing the summed inputs and bias through the activation function.

As mentioned, specific activation functions employed are largely a matter of implementation choice in any given application. It is possible for each and every unit in a neural network to have a unique activation function. However, it is typical for units within the input and hidden layers to have the same activation function and to use different functions for the output layer. Again, whether to use different functions is primarily an implementation choice.

One use for the systems that have been described thus far is to rank elements in data sets. A specific data set of interest is a set of web pages created as a result of a search query formulated by a user. Within that data set, a user typically desires the web pages in the result to be ordered from the most likely to be responsive to his search request to the least likely. Web pages having the same likelihood of responsiveness (e.g., the same probability of a match with the query based upon certain criteria) should receive the same rank. For presentation to the user, ordering of web pages with the same rank may be arbitrary or may be based upon any appropriate scheme.

To construct and configure a neural network of the type discussed, a number of factors are considered. Appropriate activation functions and thresholds are created or selected. Input data formats are defined. The number of units and layers is determined, along with interconnection topologies for those units and layers. When construction is completed, the network is trained and tested. Further details related to these activities, with a view toward use for web page ranking, are discussed below.

An example ranking problem includes a training set of samples $$x_i, i=1, \ldots, m, x_i \in R^d$$

together with a mapping of samples to their desired ranks, $$R(x_i)=r_i$$

with $r_i \in \{1, \ldots, N\}$, where N is assumed to be fixed. The map R can be many to one in the sense that multiple samples can have the same rank, but every training sample is assigned a rank. In a more flexible manner, pairs of training examples can be presented to the system, where the first element of the pair is desired to be ranked above the second. In this case, the pairs presented can represent desired rankings even if no map of the form described above exists (for example, pairs of samples [1,2], [2,3] and [3,1]). Ranks can be modeled probabilistically: that is, for each pair i, j, the model will learn an approximation to the probability that $r_i > r_j$. A probabilistic model may be more desirable for this problem than in the case of pattern recognition or regression estimation because during labeling, the problem of assigning the correct ranking to an object in a set based on its features is often a more subjective process than the corresponding problem of label assignment in a simple classification task. Here we describe a method to compute probabilistic rankings, although the invention also handles methods for non-probabilistic rankings.

Although a neural network could be trained to perform ordinal regression in order to solve the ranking problem, such a system requires that a particular target value be defined for each input training pattern. Because in many ranking applications it is not the value of the ranking function that matters but simply the rank position that the system ascribes to the patterns, using a neural net for ordinal regression to solve the ranking problem is solving an unnecessarily hard problem. Therefore, in this invention we propose a method for allowing the neural network to choose any mapping that is as consistent as possible with the set of ranked pairs used for training. Whereas in usual neural network training, the cost function is a function of the network output of a single pattern, here it is taken to be a function of the difference of the network outputs of a pair of patterns whose relative desired rank is known.

Consider models $f:R^d \mapsto R$ such that $f(x_1) > f(x_2)$ means that the model ranks $x_1$ higher than $x_2$. The modeled probability $P(x_i \triangleright x_j | x_i, x_j)$ is denoted by $P_{ij}$. The desired target values for the probabilities are denoted as $\overline{P}_{ij}$. If $f_{ij} \equiv f(x_i) - f(x_j)$ is defined, then the cross entropy cost function used can then be defined as:

$$C_{ij} \equiv C(f_{ij}) = -\overline{P}_{ij} \log P_{ij} - (1 - \overline{P}_{ij}) \log(1 - P_{ij})$$

where $P_{ij}$ is a function of $f_{ij}$.

The map from outputs of the model to probabilities for a cross entropy cost function can be achieved by using a sigmoidal function:

$$P_{ij} \equiv \frac{e^{\alpha f_{ij}}}{1 + e^{\alpha f_{ij}}}$$

However, here the function values correspond to the pair of outputs associated with a pair of patterns. The previously defined cost function, $C_{ij}$, can then be expressed in the following terms:

$$C_{ij} = -\overline{P}_{ij} \alpha f_{ij} + \log(1 + e^{\alpha f_{ij}})$$

The cost function C has two notable properties. First, the function becomes linear as $f_{ij}$ increases. Second, in the case when $$\overline{P}_{ij} = \frac{1}{2}$$

(for example, when two patterns have the same desired rank), the function becomes symmetric and its first derivative vanishes at the origin. Linearity as $f_{ij}$ increases is desirable because higher-order costs tend to penalize unimportant outliers at the cost of overall generalization performance. Symmetry when $$\overline{P}_{ij} = \frac{1}{2}$$

is desirable because such symmetry allows a principled means to train on patterns that are desired to have the same rank.

Figure 12:
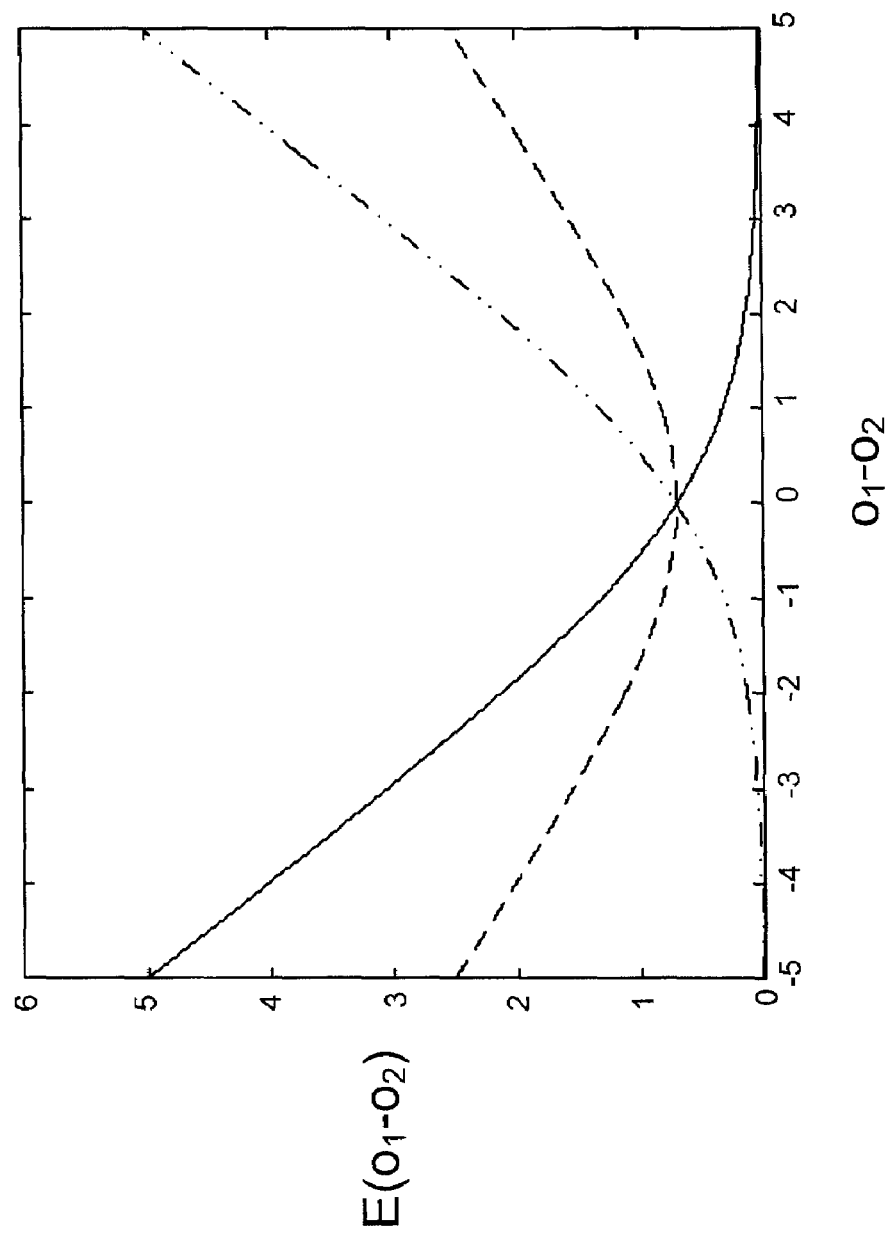
FIG. 12 illustrates a plot of E as a function of $f_{ij}$ for the three values $\overline{P}=\{0, 0.5, 1\}$.

Table 1, as seen in FIG. 12, depicts a plot of as a function of $f_{ij}$ for the three values $\overline{P}=\{0, 0.5, 1\}$, where here we have introduced notation $o_i \equiv f(x_i)$ for the output of the ranking system.

It should be noted that this cost function is quite different from some other cost functions used to train neural networks for regression, for example the least squares cost function, which is symmetric about the origin. Here, the cost function is asymmetric, so that if $o_1 o_2$ is large and positive, and $\overline{P}_{ij}=1$ so that the user is certain that pattern 1 is to be ranked higher than pattern 2, then the cost is low. If $o_1-o_2$ is large and negative, and still $\overline{P}_{ij}=1$, the cost is large. If instead $$\overline{P}_{ij} = \frac{1}{2},$$

then the cost function becomes symmetric, which has the effect of encouraging the network to give patterns that have been ascribed the same rank, the same output. Here, the cost function is a function of the difference of output values of two patterns rather than a function of the output value of a single pattern.

This model places the following consistency requirements on the $\overline{P}_{ij}$: given $\overline{P}_{ij}$ and $\overline{P}_{jk}$, it is possible to calculate resulting conditions on $\overline{P}_{ik}$. Consistency conditions arise with the requirement that certain ideal outputs $\overline{o}_i$ of the model exist such that $$\overline{P}_{ij} \equiv \frac{e^{\overline{o}_{ij}}}{1+e^{\overline{o}_{ij}}}$$

where $\overline{o}_{ij} \equiv \overline{o}_i - \overline{o}_j$ and where $\alpha$ is included in the definition of $\overline{o}$. If the consistency requirement is not met, no sets of outputs of the model will exist that yield the desired pair-wise probabilities. For example, given $\overline{P}_{ij}$ and $\overline{P}_{jk}$, $\overline{P}_{ik}$ in closed form is computed as:

$$\overline{P}_{ik} = \frac{\overline{P}_{ij}\overline{P}_{jk}}{1+2\overline{P}_{ij}\overline{P}_{jk}-\overline{P}_{ij}-\overline{P}_{jk}}$$

Figure 13:
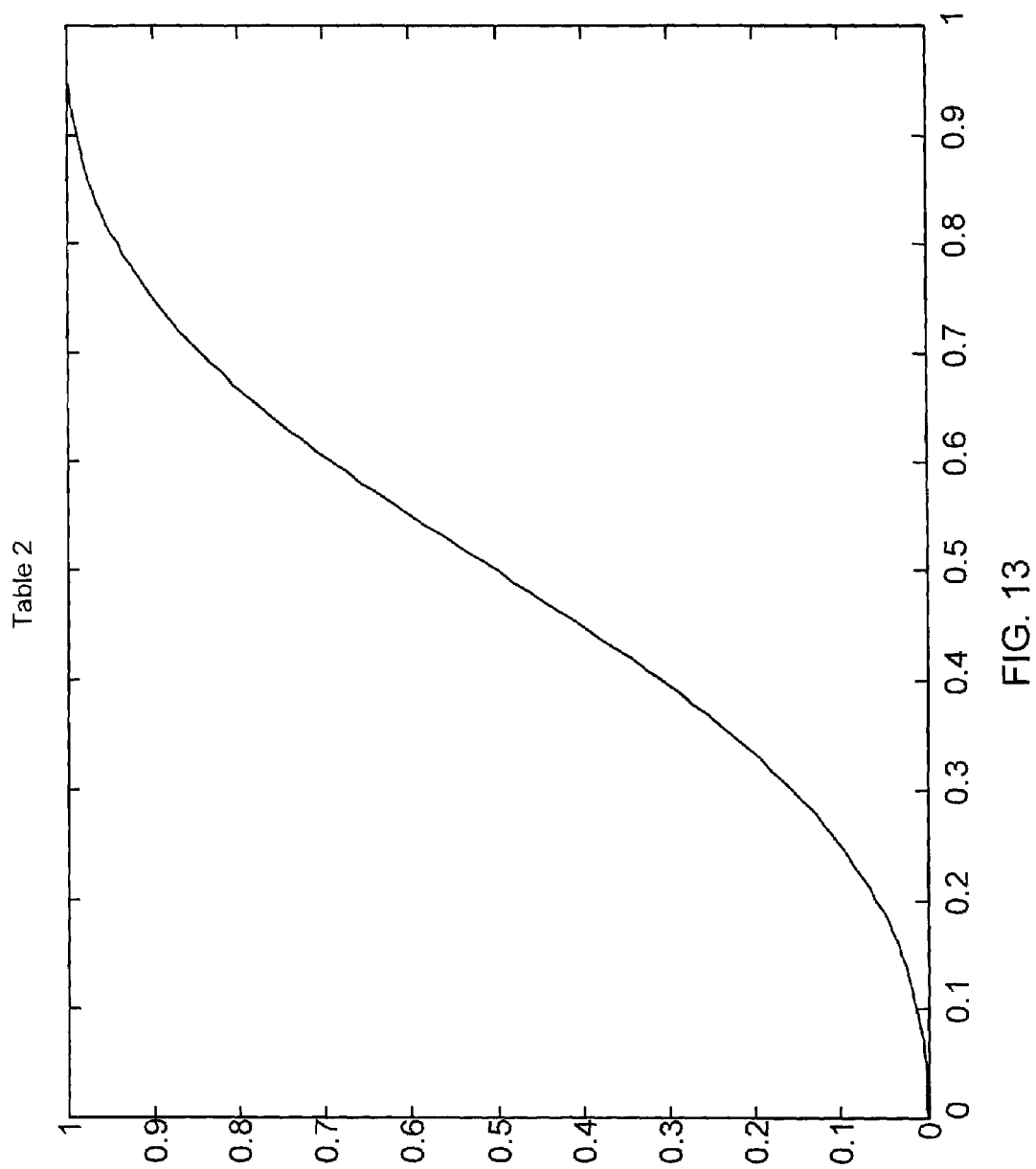
FIG. 13 illustrates a graph depicting the case of $\overline{P}_{ij}=\overline{P}_{jk}=\overline{P}$.

This is plotted in Table 2, as seen in FIG. 13, for the case $\overline{P}_{ij}=\overline{P}_{jk}=P$.

The combined probability $\overline{P}_{ik}$ has several notable properties. First, $\overline{P}_{ik}=P$ at the three points P=0, P=0.5 and P=1, and only at those points. So for example, if it is known that the probability of A▷B (that is, the event that A is ranked higher than B) is 0.5, and that the probability of B▷C is 0.5, then it follows that the probability of A▷C is also 0.5. Confidence, or lack of confidence, builds as expected: for values of T where 0<T<0.5, then $\overline{P}_{ik}<T$ and for values of T such that 0.5<T<1.0, then $\overline{P}_{ik}>T$.

For purposes of exposition, it is useful to consider the following. Given a labeled sample set $\{x_i, r_i\}$, i=1, ..., m, $r_i \in \{1 \ldots N\}$, assume that an arbitrary target posterior $0 \leq \overline{P}_{ij} \leq 1$ has been specified for every adjacent pair $r_i$, i=1, ... N−1, $r_j=r_i+1$; referred to as the adjacency posteriors. Then, specifying the adjacency posteriors is sufficient to uniquely identify a target posterior $0 \leq \overline{P}_{ij} \leq 1$ for every pair $r_i$, $r_j$, $r_i \leq r_j$.

This is shown as follows. Specifying the adjacency posteriors gives values for all target posteriors. From the equation $$\overline{P}_{ij} \equiv \frac{e^{\overline{o}_{ij}}}{1+e^{\overline{o}_{ij}}}$$

$\overline{o}$ is:

$$\overline{o}_{ij} = \log \frac{\overline{P}_{ij}}{1-\overline{P}_{ij}}$$

Therefore, for any $\overline{o}_{jk}$, $j \leq k$, can be computed as $$\sum_{m=j}^{k-1} \overline{o}_{m,m+1}.$$

The formula $$\overline{P}_{ij} \equiv \frac{e^{\overline{o}_{ij}}}{1+e^{\overline{o}_{ij}}}$$

demonstrates that the resulting probabilities lie between 0 and 1. Uniqueness is demonstrated as follows: for any i, j, $\overline{P}_{ij}$ can be computed. Given a set of previously computed posteriors $\overline{P}_{im_1}, \overline{P}_{m_1 m_2}, \ldots, \overline{P}_{m_n j}, \overline{P}_{ij}$ can be calculated by first computing the corresponding values of $\overline{o}_{kl}$, adding those values, and then using $$\overline{P}_{ij} \equiv \frac{e^{\overline{o}_{ij}}}{1+e^{\overline{o}_{ij}}}.$$

However because $\overline{o}_{kl}=\overline{o}_k-\overline{o}_l$, the intermediate terms cancel, leaving just $\overline{o}_{ij}$. The resulting $\overline{P}_{ij}$ is unique.

Although the above formulas provide a useful method for computing $\overline{P}_{ij}$ given an arbitrary set of adjacency posteriors, it is also useful to compute the $\overline{P}_{ij}$ for the special case when all adjacency posteriors are equal in value, for example when all are equal to P. In that case $$\overline{o}_{i,i+1} = \log(P/(1-P)),$$

and $$\overline{o}_{i,i+n} = \overline{o}_{i,i+1} + \overline{o}_{i+1,i+2} + \ldots + \overline{o}_{i+n-1,i+n} = n\overline{o}_{i,i+1}$$

gives $$P_{i,i+n} = \Pi^n/(1+\Pi^n),$$

where $\Pi$ is the odds ratio $\Pi = P/(1-P)$. $P_{i,i+n}$ has the following notable properties.

Let $n>0$. If $$P > \frac{1}{2},$$

then $P_{i,i+n} \geq P$ with equality when $n=1$, and $P_{i,i+n}$ increases strictly monotonically with n. If $$P < \frac{1}{2},$$

then $P_{i,i+n} \leq P$ with equality when $n=1$, and $P_{i,i+n}$ decreases strictly monotonically with n. If $$P = \frac{1}{2},$$

then $$P_{i,i+n} = \frac{1}{2}$$

for all n.

This is shown as follows. Assume $n>0$. Because $$P_{i,i+n} = 1 / \left(1 + \left(\frac{1-P}{P}\right)^n\right).$$

for values of $$P > \frac{1}{2}, \frac{1-P}{P} < 1$$

and the denominator decreases strictly monotonically with n. For values of $$P < \frac{1}{2}, \frac{1-P}{P} > 1$$

and the denominator increases strictly monotonically with n. For values of $$P = \frac{1}{2}, P_{i,i+n} = \frac{1}{2}$$

by substitution. Finally if $n=1$, then $P_{i,i+n}=P$ by construction.

With respect to how the neural net is trained, the typical method is backpropagation using a gradient descent with reference to some cost function. The following example is one approach that may be employed. We present here the mathematics of the backpropagation algorithm to place our method in context.

For illustration, consider a two layer feed forward neural net. No further assumptions are made about connections between layers or among units. For example, some of the first layer nodes or units can be connected to a subset of the inputs $x_i$. From the example discussed, it is possible to generalize to more than one output, or to a different number of layers. Here we describe the general situation, although for the typical ranking application, the neural net would have just one output. Let the outputs be $o_i$, the targets be $t_i$, and the cost function at a given node be $f$. The total cost function C is then represented as:

$$C = \Sigma_i f(o_i, t_i)$$

where the sum is over the output nodes.

Two assumptions are made with respect to the function C. First, it is assumed that the cost function is the same at each node. Second, it is also assumed that the cost at a given node does not depend on the outputs at other nodes. Note that if $\alpha_i$ are the parameters of the model, gradient descent is modeled by the following derivative:

$$\delta C = \sum_i \frac{\partial C}{\partial \alpha_i} \delta \alpha_i \rightarrow \delta \alpha_i = -\eta_i \frac{\partial C}{\partial \alpha_i}$$

where $\eta_i$ is a positive learning rate.

Let the output at the i'th node be $$o_i = g^3[\Sigma_j w_{ij}^{32} g^2[\Sigma_k w_{jk}^{21} x_k + b_j^2] + b_i^3] \equiv g_i^3$$

where $g^k$ is an activation function for the nodes in the kth layer of nodes, the w are weights, and the b are biases. Here, the upper indices index the layer and the lower indices index the nodes. The derivative of C with respect to the parameters is:

$$\frac{\partial C}{\partial b_m^3} = \sum_i \frac{\partial f}{\partial o_i}\frac{\partial o_i}{\partial b_m^3} = \sum_i \frac{\partial f}{\partial o_i} g_i'^3 \delta_{im} = \frac{\partial f}{\partial o_m} g_m'^3 \equiv \Delta_m^3$$

$$\frac{\partial C}{\partial w_{mn}^{32}} = \sum_i \frac{\partial f}{\partial o_i} g_i'^3 \delta_{im} g_n^2 = \frac{\partial f}{\partial o_m} g_m'^3 g_n^2 = \Delta_m^3 g_n^2$$

$$\frac{\partial C}{\partial b_m^2} = \sum_i \frac{\partial f}{\partial o_i}\frac{\partial o_i}{\partial b_m^2}$$

$$= \sum_i \frac{\partial f}{\partial o_i} g_i'^3 w_{im}^{32} g_m'^2$$

$$= \left(\sum_i \frac{\partial f}{\partial o_i} g_i'^3 w_{im}^{32}\right)$$

$$= g_m'^2 \left(\sum_i \Delta_i^3 w_{im}^{32}\right) \equiv \Delta_m^2$$

$$\frac{\partial C}{\partial w_{mn}^{21}} = \sum_i \frac{\partial f}{\partial o_i}\frac{\partial o_i}{\partial w_{mn}^{21}}$$

$$= \sum_i \frac{\partial f}{\partial o_i} g_i'^3 \sum_j w_{ij}^{32} g_j'^2 \delta_{jm} \sum_k \delta_{kn} x_k$$

$$= g_m'^2 x_n \left(\sum_i \frac{\partial f}{\partial o_i} g_i'^3 w_{im}^{32}\right) \equiv x_n \Delta_m^2$$

It is useful to note the following pattern. Let the derivative with respect to b at a given node be delta. To derive with respect to w, delta at the node above can be multiplied by the current activation. To compute the delta for the current node, the deltas above can be summed, multiplied by the weight joining to the node(s) above, and multiplied by the gradient (the gradient of the activation function).

Backpropagation includes the following acts. First, a forward pass is performed through the nodes of the neural network to compute the outputs $o_i$. The values of the outputs and the values of the derivatives of the outputs are saved for every node in the network. $\Delta_m^3$ is computed for the output layer and the output thresholds can be updated. Using $\Delta_m^3$, the weight updates for layer 2-3 can be computed by multiplying $\Delta_m^3$ by the outputs of the previous layer. $\Delta_m^2$ can be computed by way of using $\Delta_i^3$ and the gradients of the outputs and the weights. This process is repeated as necessary.

To adapt this scheme for stochastic gradient descent, the weights as previously described can be adapted and the aforementioned process can be repeated until completion. For batch learning, the delta w's can be saved and incremented over all the training examples, and thereafter the delta w's can be updated.

Turning now to ranking, the backpropagation example presented is extended and modified to perform the learning of ranking functions. Consider a ranking problem where an input example x is mapped to a point y on the real line. Often in ranking problems, it is more desirable to predict the correct rank, which is a relative measure, rather than the output values y. However, it is also possible to encode the relative importance of getting the rank correct for different pairs of examples. Whatever machine learning system is used, the exemplary system uses pairs of examples for training. However, in the test phase, the system should preferably map single examples to the real numbers because testing on pairs of examples is typically prohibitively expensive. However, in a specific implementation, testing on pairs may be employed.

The cost function for a neural network is a function of the outputs $o_1$, $o_2$ corresponding to two inputs $x_1$, $x_2$. A cost function can be introduced—$f(o_2-o_1)$. Note that the cost function can also contain parameters encoding the importance of getting the rank for the given pair of examples correct. Here, $f$ is a monotonic increasing function such that $\lim_{x \to -\infty} f(x)=0$. Thus, if the desired ranking of $x_1$ and $x_2$ is $x_1 \triangleright x_2$, and the system outputs $o_1 \geq o_2$, there is small penalty. However, if $o_1 < o_2$, the penalty is larger and the penalty increases as $o_2 - o_1$ increases.

With this cost function, the previous backpropagation example can be modified to handle ranking. Because the cost function is $f(o_2-o_1)$, its derivative with respect to some parameter $\beta$ is:

$$\frac{\partial C}{\partial \beta} = f'\left(\frac{\partial o_2}{\partial \beta} - \frac{\partial o_1}{\partial \beta}\right).$$

This gradient cannot be written as the sum of two gradients, each of which depends only on one example, because f' depends on two examples. Therefore to implement this ranking example, forward propagate two examples, save the activations and gradients for each, and then update. Additionally, the cost function can depend on pairs of examples through a weight that encodes the importance of correctly ranking the two examples. Some convention as to whether the higher-ranked example is passed through first or second must also be adopted. Here, the higher-ranked example ($x_1$) is passed through first.

The following example is of a 3 layer (that is, three layers of weights) neural network. The output nodes are labeled 3 and the input nodes labeled 0. The cost function is:

$$C = f(o_2 - o_1) : o_i = g^3[\Sigma_j w_j^{32} g^2[\Sigma_k w_{jk}^{21} g^1[\Sigma_m w_{km}^{10} x_{lm} + b_k^1] + b_j^2] + b^3] = g_i^3$$

where the subscript 1 on the g means x1. Also writing $f' \equiv f'(o_2 - o_1)$:

$$\frac{\partial C}{\partial b^3} = f'\left(\frac{\partial o_2}{\partial b^3} - \frac{\partial o_1}{\partial b^3}\right) = f'(g_2'^3 - g_1'^3) \equiv \Delta_2^3 - \Delta_1^3$$

$$\frac{\partial C}{\partial w_m^{32}} = f'(g_2'^3 g_{2m}^2 - g_1'^3 g_{1m}^2) = \Delta_2^3 g_{2m}^2 - \Delta_1^3 g_{1m}^2$$

$$\frac{\partial C}{\partial b_m^2} = f'\left(g_2'^3 \sum_j w_j^{32} g_{2j}'^2 \delta_{jm} - \ldots\right)$$

$$= f'(g_2'^3 w_m^{32} g_{2m}'^2 - \ldots)$$

$$= \Delta_2^3 w_m^{32} g_{2m}'^2 - \ldots \equiv \Delta_{2m}^2 - \Delta_{1m}^2$$

$$\frac{\partial C}{\partial w_{mn}^{21}} = f'\left(g_2'^3 \sum_j w_j^{32} g_{2j}'^2 \sum_k \delta_{kn} \delta_{jm} g_{2k}^1 - \ldots\right)$$

$$= f'(g_2'^3 w_m^{32} g_{2m}'^2 g_{2n}^1 - \ldots) \equiv \Delta_{2m}^2 g_{2n}^1 - \Delta_{1m}^2 g_{1n}^1$$

-continued $$\frac{\partial C}{\partial b_m^1} = f'\left(g_2'^3 \sum_j w_j^{32} g_2'^2 \sum_k w_{jk}^{21} g_{2k}'^1 \delta_{km} - \ldots\right)$$

$$= f'\left(g_2'^3 \sum_j w_j^{32} g_2'^2 w_{jm}^{21} g_{2m}'^1 - \ldots\right)$$

$$= \sum_j \Delta_{2j}^2 w_{jm}^{21} g_{2m}'^1 - \ldots \equiv \Delta_{2m}^1 - \Delta_{1m}^1$$

$$\frac{\partial C}{\partial w_{mn}^{10}} = f' g_2'^3 \sum_j w_j^{32} g_2'^2 \sum_k w_{jk}^{/2} g_{2k}'^1 \sum_p \delta_{km} \delta_{pn} x_{2p} - \ldots$$

$$= f' g_2'^3 \sum_j w_j^{32} g_2'^2 w_{jm}^{/2} g_{2m}'^1 x_{2n} - \ldots \equiv \Delta_{2m}^1 x_{2n} - \Delta_{1m}^1 x_{1n}$$

where in the above equations, the ellipsis simply means that the terms are repeated, but with subscript 1 instead of subscript 2 (e.g., as functions of $x_1$ instead of functions of $x_2$). Thus the process is similar to backpropagation, except that at each node, the corresponding quantities must be saved for pairs of patterns, rather than for single patterns. In each term, the dependence on each pattern appears as a difference of two terms, each of which depends on each individual pattern, multiplied by an overall term (the derivative of the cost function) which depends on both patterns.

Figure 4:
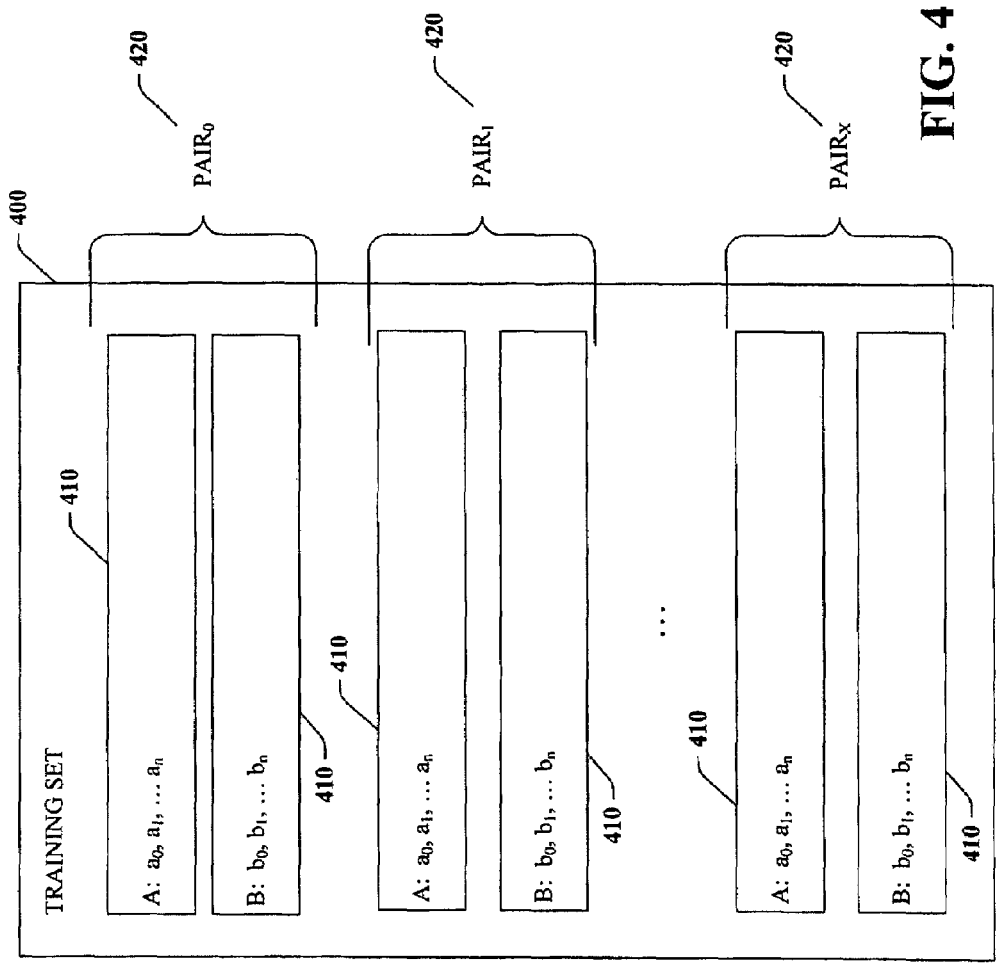
FIG. 4 is a system block diagram of a training data set that can be utilized in conjunction with one or more aspects of the disclosed invention.

With reference to FIG. 4, an exemplary training set 400 is depicted. The training set 400 is subdivided into training examples 410 that are grouped into training pairs 420. Training examples within each training pair 420 are ranked and ordered such that the A example is ranked higher than the B example. Each training example 410 contains a number of attributes, such as the pictured attributes $a_0, a_1, \ldots a_n$ and $b_0, b_1, \ldots b_n$, each having a value and used as input data for the neural network. Typically, the number of attributes, n+1, is equal to the number of nodes in the input layer of the neural network such that each input node begins its processing on a single attribute of the training example 410. The neural network's processing output based upon these attributes is a rank assigned to the example. It should be noted that to save space, rather than storing each pair of patterns for training, a single array of patterns is stored, and ranking pairs are stored as pairs of offsets into that array.

Figure 5:
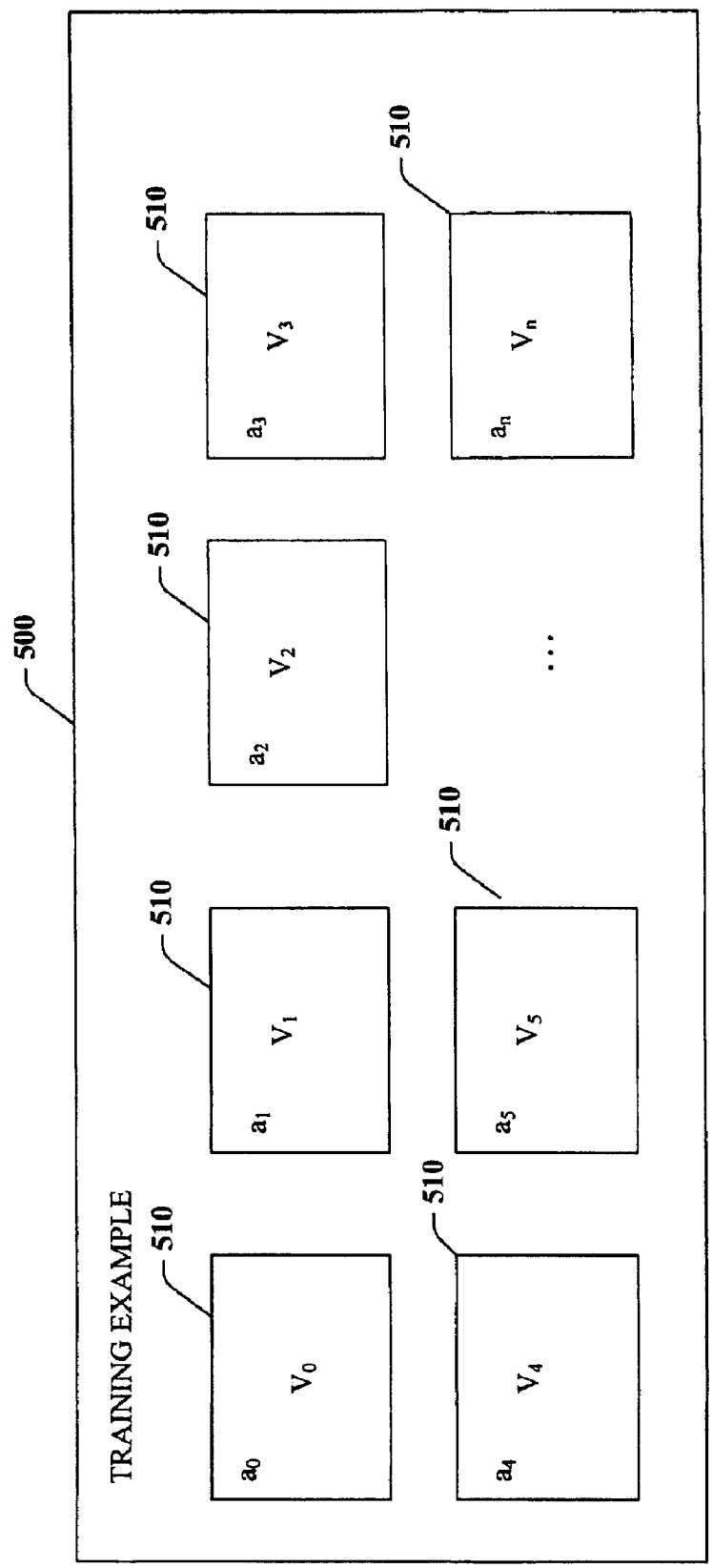
FIG. 5 is a block diagram of a training example in accordance with an aspect of the disclosed invention.

FIG. 5 is a block diagram of a training example 500. The training example 500 contains n+1 number of data attributes 510. Each data attribute 510 has a value assigned that is consistent with a definition of the attribute. For example, attribute $a_0$ may be the number of times a keyword appears in the body of a web page. In that case, the value $V_0$ of attribute $a_0$ is an integer. Attribute $a_1$ may be a measure of relative proximity of keywords within the body of the web page such that its value $V_1$ is a real number represented with some chosen precision. It should be noted that the invention is not restricted to Web applications, or to text documents. For example, a user may present an audio clip as a query, and wish to have a set of results returned which are ranked in order of similarity to the query. For this purpose both original audio data and metadata associated with the audio can be used to generate features. As another example, a user may present an image as a query and wish to have a set of results returned which are ranked in order of similarity to the query. For this purpose both the original image and metadata associated with the image can be used to generate features.

For counts data, a logarithm is typically applied first; this has the dual advantages of limiting the dynamic range of the inputs, and of easily allowing the net to learn multiplicative relationships, rather than additive ones, where multiplicative relations are usually more likely to be useful for counts data. For example, if one input corresponds to a count of a given word in a document, dividing by the total number of words in the document can provide a more informative measure. In addition, each input is linearly remapped so that, over some large representative data set, for example, the training set, it has zero mean and unit variance. The remapping function is then applied to all test data.

Figure 6:
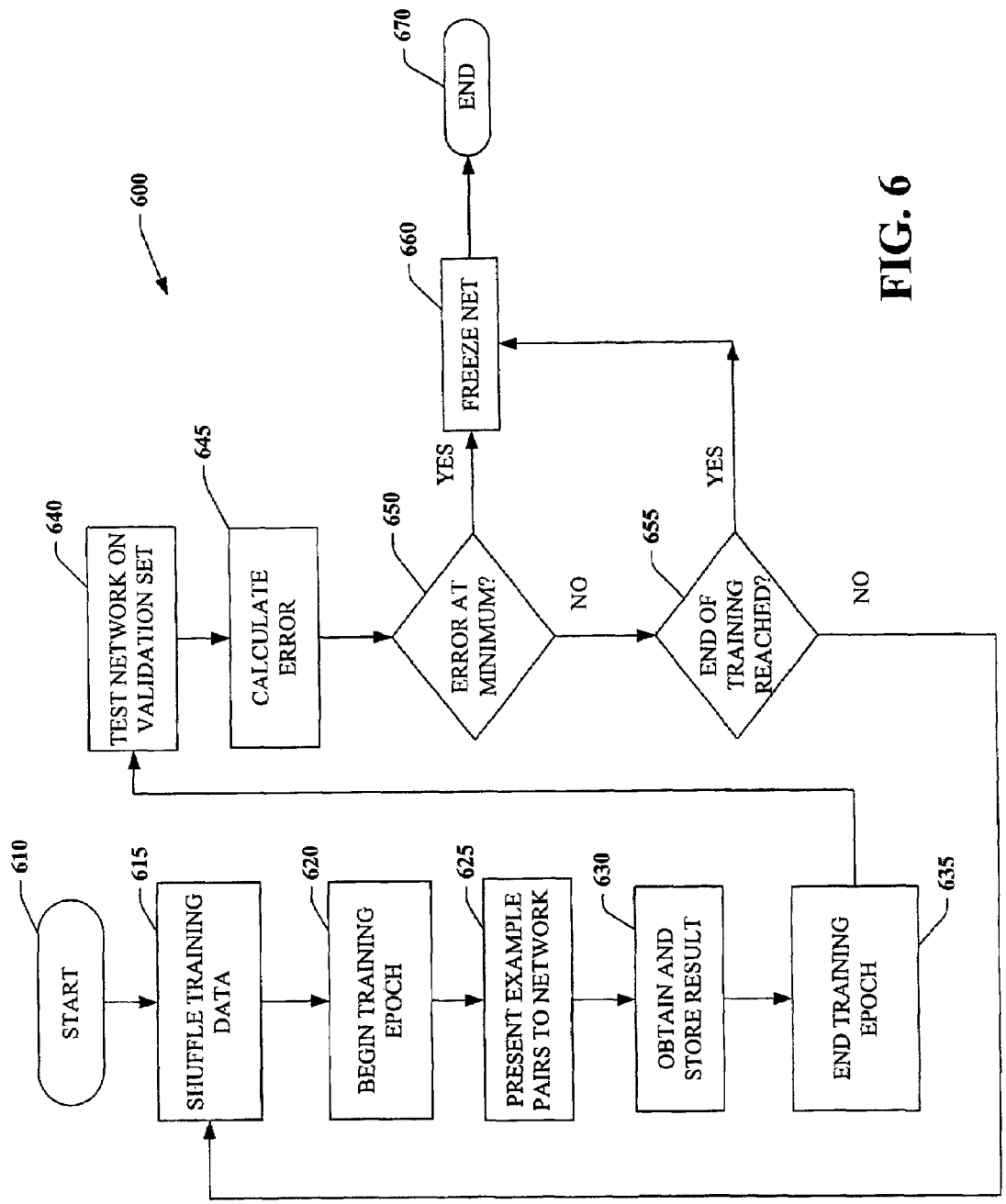
FIG. 6 is a flow diagram depicting a method in accordance with another aspect of the disclosed invention.
Figure 14:
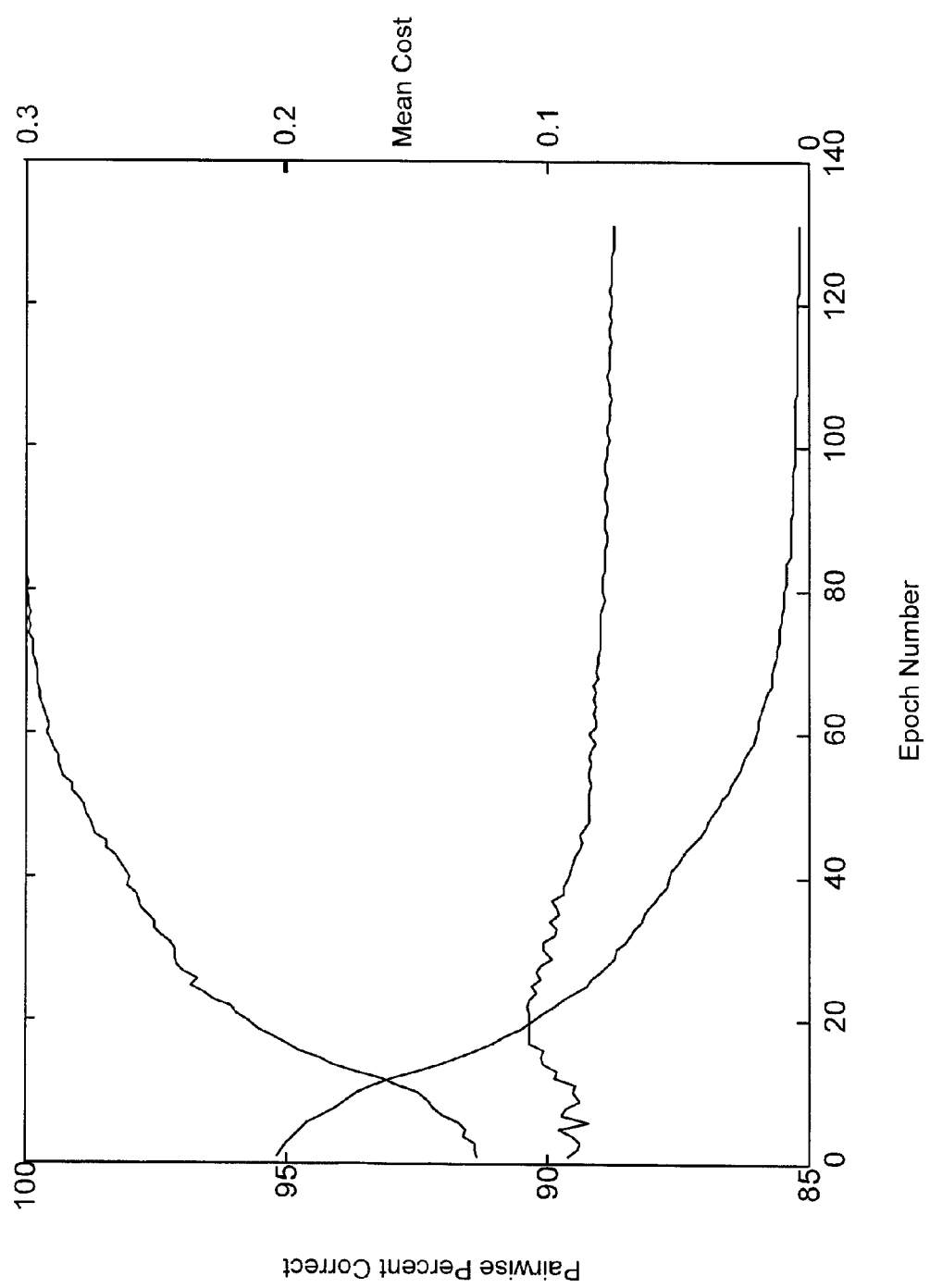
FIG. 14 illustrates a graph depicting cost information for an epoch-based training system.

FIG. 6 is a flow diagram depicting a method 600 of training a neural network in accordance with an aspect of the disclosed invention. Typically, training is performed using some preselected or fixed maximum number of training epochs for a stochastic gradient descent that ideally terminates at a minimum cost. A graph depicting cost information for an epoch-based training system is depicted in Table 3, as seen in FIG. 14.

Processing begins at START block 610 and continues to process block 615 where data in the training set is shuffled. Shuffling refers to a procedure during which data within the set is reordered before it is presented to a neural network. It is often useful to shuffle data in this fashion prior to beginning a training epoch because such shuffling can assist in convergence. At process block 620, a training epoch is begun. As depicted by process block 625, pairs from a training set are presented to the neural network. Within a given epoch, every pair of examples from the training set is presented to the network for processing. Processing results are obtained and stored at process block 630. The end of the training epoch is reached at process block 635.

Processing continues at process block 640 when the neural network is tested using a validation set. At process block 645, an error measure, such as a cost based upon an appropriate cost function as described above, is calculated. At decision block 650, the calculated error measure is evaluated to see if a minimum has been reached. If not, processing continues at decision block 655 where a determination is made whether the end of training has been reached. Decision block 655 depicts a processing case where the user wishes to impose a maximum possible number of epochs, even if no clear minimum of the error on the validation set is found. If the end of training has not been reached, processing continues at process block 615 where training data is shuffled.

If the determination made at decision block 650 indicates that the error measure has reached a minimum, processing continues at process block 660 where the parameters of the neural network are frozen. Similarly, if the determination made at decision block 655 indicates that the end of training has been reached, processing continues at process block 660 and the parameters of the neural net are frozen. Processing then terminates at END block 670. It should be appreciated that an affirmative decision at decision block 655 results in parameters of the neural network being frozen simply because there are no further training examples. In this case, the cost function may not have been minimized. It is contemplated that various techniques may be employed here to detect this condition.

Figure 7:
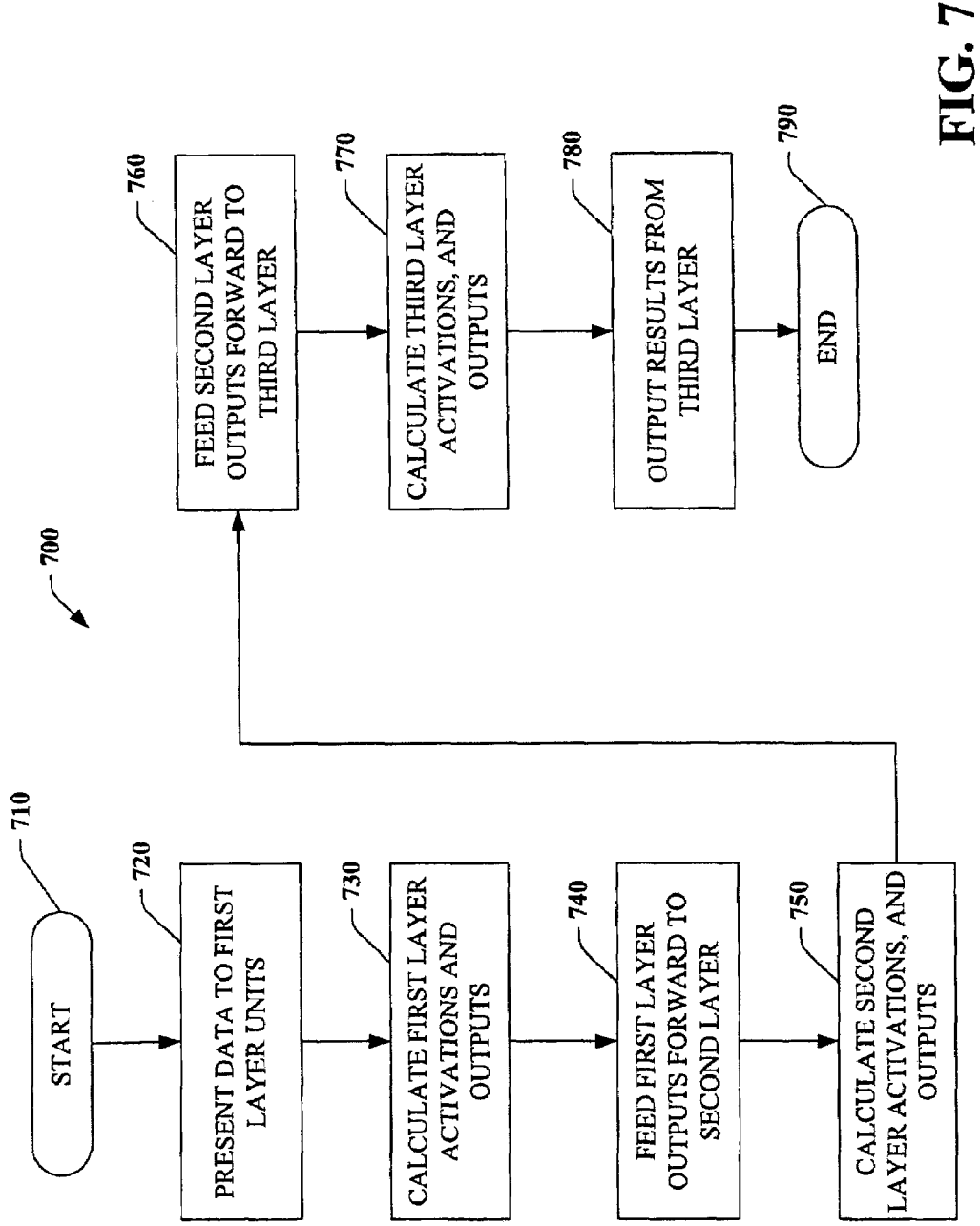
FIG. 7 is a flow diagram depicting a general processing flow in accordance with yet another aspect of the invention.

FIG. 7 is a flow diagram depicting a general processing flow 700 for the testing phase and use phase. Processing begins at START block 710 and continues to process block 720 where data is presented to the units in the first layer. At process block 730, outputs for the first layer based upon activation functions, weights, and biases are calculated. Processing continues at process block 740 where the first layer outputs are fed forward to the second layer.

At process block 750, outputs for the second layer, again based upon activation functions, weights, and biases are calculated. Processing continues at process block 760 where the second layer outputs are fed forward to the third layer. At process block 770, outputs for the third layer, still again based upon activation functions, weights, and biases, are calculated. Processing continues at process block 780 where results from the third layer are output and processing terminates at END block 790.

It should be appreciated that various modifications or alterations can be made to the disclosed systems and methods. For example, various feedback systems may be employed to improve initial training of the system or during a retraining phase. One contemplated method is boosting. In accordance with a boosting scheme, during training, incorrect results during an initial phase will be given greater significance during later training phases. This results in improved generalization performance.

Figure 8:
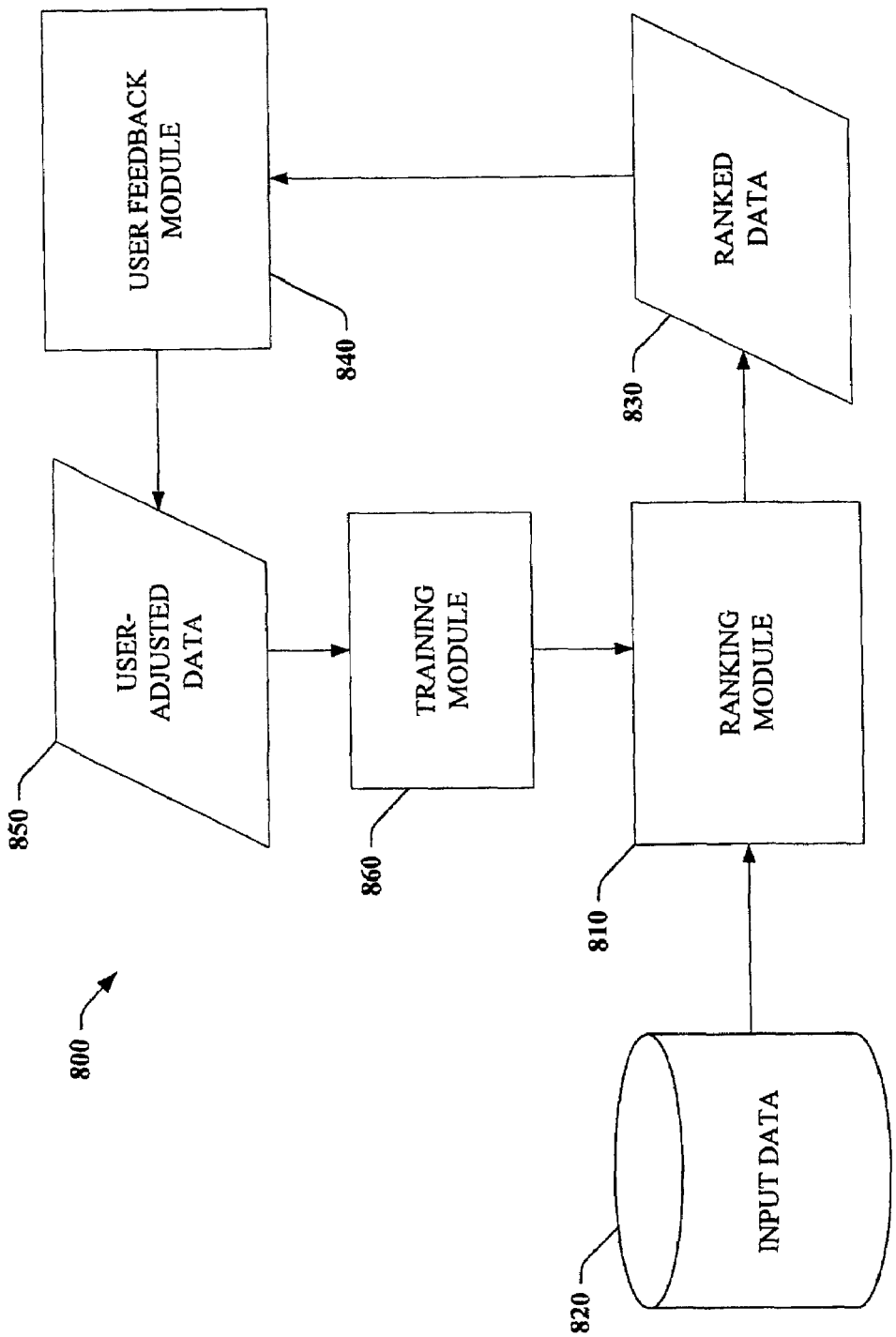
FIG. 8 is a block diagram depicting a ranking system with a feedback system in accordance with a further aspect of the invention.

Another contemplated feedback mechanism is direct user feedback. Such a scheme is depicted in FIG. 8. There, a ranking system that employs user feedback 800 is depicted. The system includes a ranking module 810 that accepts data from an input data store 820. The ranking module 810 processes the data and outputs a set of ranked data 830 to a user. A user feedback module 840 allows the user to input feedback, usually in the form of ranking preferences or suggested ranking changes, to create a set of user-adjusted data 850. A training module 860 accepts the user-adjusted data 850 as input and uses that data to adjust the functioning of the ranking module 810. The use of user feedback is advantageous since human labeling is expensive, and having humans label patterns that are ranked highly by the system means few patterns need to be labeled to solve the problem of false positives (incorrectly highly ranked patterns). However, human labeling of a statistical sampling of patterns that are not ranked highly by the system is also desirable, in order to find false negatives (patterns that are not ranked highly but that should have been).

Whereas the process described above can be used to ameliorate labeling costs, the systems and methods disclosed herein can also be employed to provide personalized or tailored results. For example, a specific user may be generally interested in sports, but may especially like baseball and most especially, the Red Sox team. As part of using a ranking system, such as the system depicted in FIG. 8, the user may simply perform searches for general sports-related topics. However, when using the user-feedback module 840, that user may consistently rank results regarding baseball and the Red Sox higher than other results. That user's ranking can then be used in further training to rank such results higher initially for that user. Alternatively, if user ranking preferences are known beforehand, those ranking preferences can be incorporated into the initial training phase.

Figure 9:
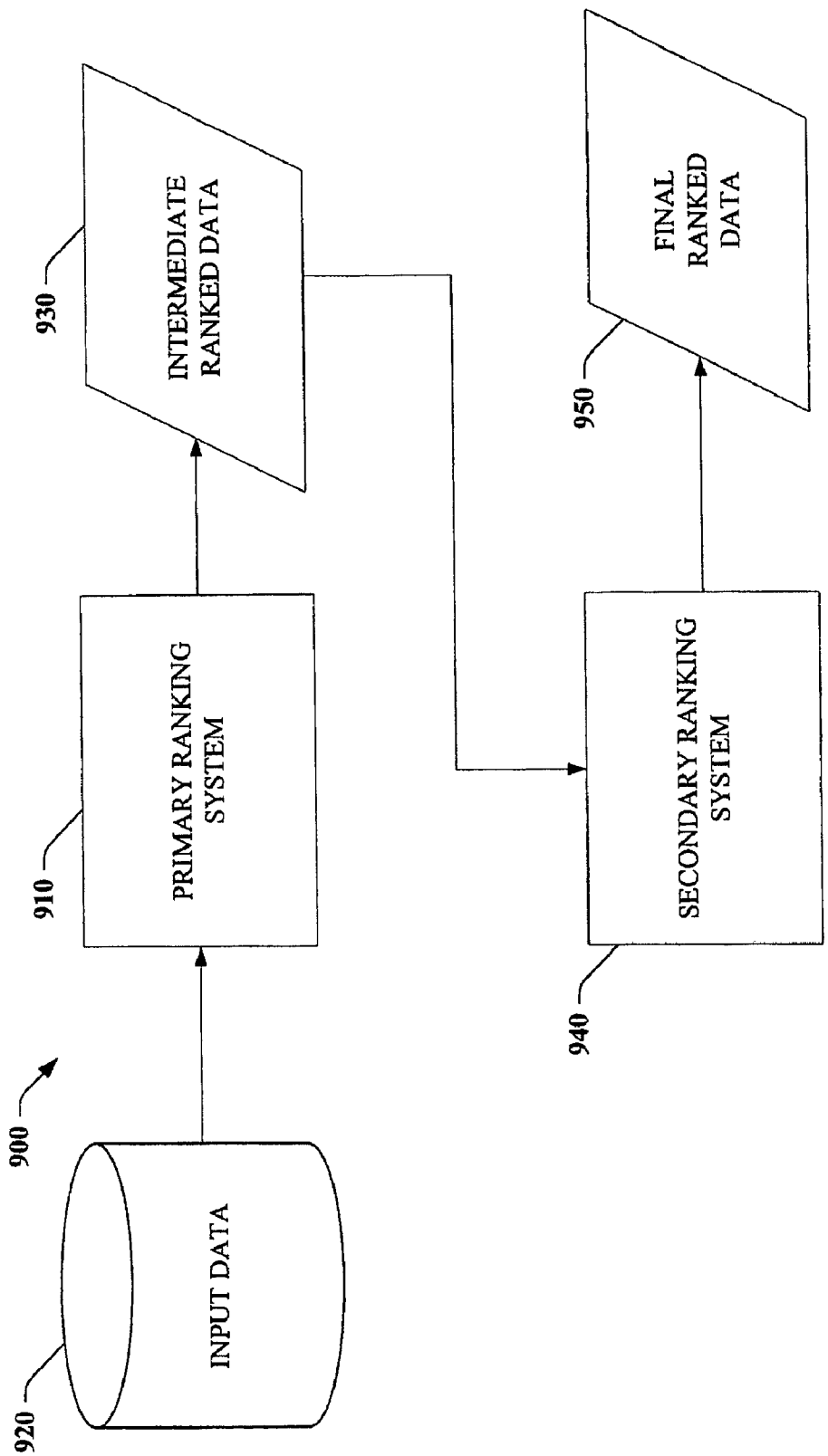
FIG. 9 is a block diagram depicting a ranking system employing a secondary ranking system in accordance with another aspect of the invention.

Another possible approach is available with the system depicted in FIG. 9. A personalized ranking system 900 is depicted. The system includes a primary ranking system 910 that accepts data from an input data store 920. The primary ranking system 910 processes the data and outputs a set of intermediate ranked data 930. That intermediate ranked data 930 is then input to a secondary ranking system 940. The secondary ranking system re-ranks the data based upon its user-specific training. After processing, the secondary ranking system 940 outputs a set of final ranked data 950 to the user. Although not shown, feedback mechanisms and methods, including those of the type described above, may be employed with the system of FIG. 9 as well as other disclosed systems and methods. Thus, for a Web document ranking application the first system might return a large number of documents that are deemed likely to be relevant in some way to the query, and the second system can then rearrange the ranking results to reflect known interests of the user. Since the first system does most of the work, in one example, the first system might reside on a server, and the second on the user's client computer; the second system can then be trained in the background on information automatically gathered on the interests of the user.

Figure 10:
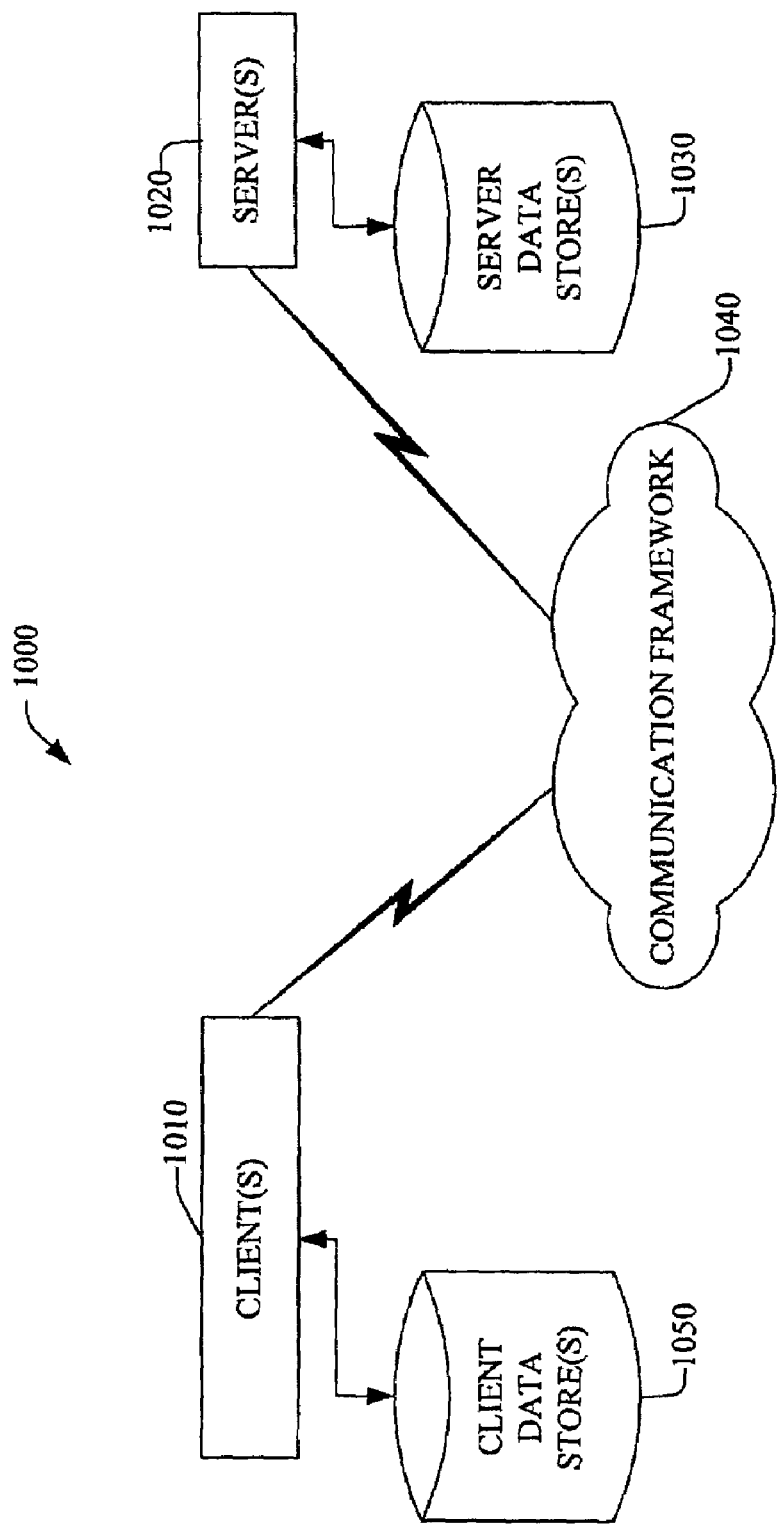
FIG. 10 illustrates an exemplary networking environment, wherein the novel aspects of the subject invention can be employed.
Figure 11:
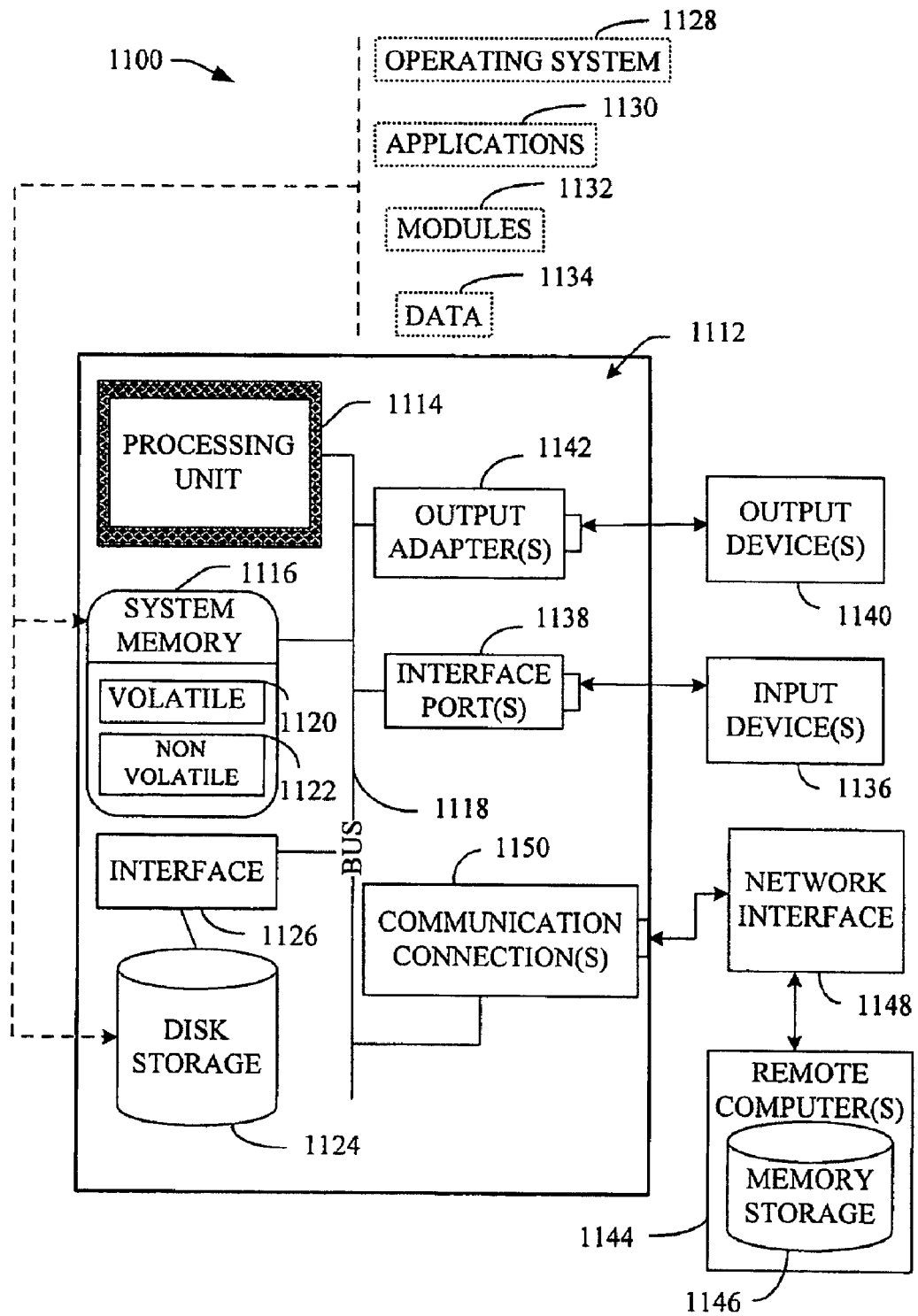
FIG. 11 illustrates an exemplary operating environment, wherein the novel aspects of the subject invention can be employed.

In order to provide additional context for implementing various aspects of the subject invention, FIGS. 10-11 and the following discussion is intended to provide a brief, general description of a suitable computing environment within which various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads or processes to perform transformations by employing the subject invention, for example.

One possible means of communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. For example, FIG. 11 illustrates a disk storage 1124. The disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. The operating system 1128, which can be stored on the disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. The input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A document analysis machine learning system using a neural network model to rank data within sets, comprising:
    at least one processor;
    a ranking module coupled to the at least one processor and having differentiable parameters, each of the differentiable parameters having a plurality of potential weights, to determine a rank value for an input example based on the weights of differentiable parameters, wherein weights are trained with a training data set that includes pairs of ranked examples; and
    a cost calculation module coupled to the at least one processor that uses a ranking cost function to determine the weights associated with said differentiable parameters,
        wherein the cost function is an asymmetric and differentiable function that maps a result of a comparison of a target rank value of a pair of input examples with measured rank values of the pair of input examples to a real number,
            wherein the target rank value varies for each pair of input examples, and
            wherein an input example is represented by said differential parameters and the rank value of the input example is generated according to the weights associated with differential variables,
            wherein the weights are set according to a minimization of the total cost, which comprises the sum of plurality of cost associated with each pair of input examples,
                wherein the cost of each pair of input example weights are updated according to a difference of two terms, with a first term depending on the first example and a second term depending on the second example, multiplied by the derivative of the cost function; and
    a final output of the ranking system including a final weight assigned to the differentiable parameters used for ranking documents, wherein ordering a data set based upon the rank value is consistent with a final weight assigned for each of the differentiable parameters selected as a function of the cost function.

2. The machine learning system of claim 1, wherein the ranking module is capable of being tuned using gradient descent.

3. The machine learning system of claim 1, further comprising: a filter module that sorts data based upon at least one criterion.

4. The machine learning system of claim 3, further comprising a user feedback module that is operatively connected to the ranking module.

5. A computer-implemented document analysis using a neural network model method of ranking data, comprising:
    storing, in a memory, instructions for performing the method of ranking data using a neural network model;
    executing the instructions on a processor;
    according to the instructions being executed:
        determining a rank value for an input example utilizing a ranking module coupled to the processor,
            wherein the ranking module comprises differentiable parameters, each of the differentiable parameters having a plurality of potential weights,
                wherein the ranking module determines the rank value for an input example based on the weights of the differentiable parameters,
                wherein weights are trained with a training data set that includes pairs of ranked examples; and
        utilizing a cost calculation module coupled to the processor,
            wherein the cost calculation module uses a ranking cost function to determine the weights associated with said differentiable parameters,
                wherein the cost function is an asymmetric and differentiable function that maps a result of a comparison of a target rank value of a pair of input examples with measured rank values of the pair of input examples to a real number,
                wherein the target rank value varies for each pair of input examples, and wherein an input example is represented by said differential parameters and the rank value of the input example is generated according to the weights associated with differential variables,
                wherein the weights are set according to a minimization of the total cost, which comprises the sum of plurality of cost associated with each pair of input examples,
                wherein the cost of each pair of input example weights are updated according to a difference of two terms, with a first term depending on the first example and a second term depending on the second example, multiplied by the derivative of the cost function; and
        outputting a final output, wherein the final output of the ranking system includes a final weight assigned to the differentiable parameters used for ranking documents, wherein ordering a data set based upon the rank value is consistent with a final weight assigned for each of the differentiable parameters selected as a function of the cost function.

6. The computer-implemented method of claim 5, wherein the ranking module is capable of being tuned using gradient descent.

7. The computer-implemented method of claim 5, further comprising:
    utilizing a filter module that sorts data based upon at least one criterion.

8. The computer-implemented method of claim 7, further comprising utilizing a user feedback module that is operatively connected to the ranking module.

9. A computer readable medium encoded with instructions for ranking data utilizing a neural network model, the instructions implementing a method comprising:
    storing, in a memory, instructions for performing the method of ranking data using a neural network model;
    executing the instructions on a processor;
    according to the instructions being executed:
        determining a rank value for an input example utilizing a ranking module coupled to the processor,
            wherein the ranking module comprises differentiable parameters, each of the differentiable parameters having a plurality of potential weights, wherein the ranking module determines the rank value for an input example based on the weights of the differentiable parameters, wherein weights are trained with a training data set that includes pairs of ranked examples; and utilizing a cost calculation module coupled to the processor, wherein the cost calculation module uses a ranking cost function to determine the weights associated with said differentiable parameters, wherein the cost function is an asymmetric and differentiable function that maps a result of a comparison of a target rank value of a pair of input examples with measured rank values of the pair of input examples to a real number, wherein the target rank value varies for each pair of input examples, and wherein an input example is represented by said differential parameters and the rank value of the input example is generated according to the weights associated with differential variables, wherein the weights are set according to a minimization of the total cost, which comprises the sum of plurality of cost associated with each pair of input examples, wherein the cost of each pair of input example weights are updated according to a difference of two terms, with a first term depending on the first example and a second term depending on the second example, multiplied by the derivative of the cost function; and outputting a final output, wherein the final output of the ranking system includes a final weight assigned to the differentiable parameters used for ranking documents, wherein ordering a data set based upon the rank value is consistent with a final weight assigned for each of the differentiable parameters selected as a function of the cost function.

10. The computer readable medium of claim 9, wherein the ranking module is capable of being tuned using gradient descent.

11. The computer readable medium of claim 9, further comprising: a filter module that sorts data based upon at least one criterion.

12. The computer readable medium of claim 11, further comprising a user feedback module that is operatively connected to the ranking module.

* * * * *